US011362909B2

(12) United States Patent
Embarmannar Vijayan et al.

(10) Patent No.: US 11,362,909 B2
(45) Date of Patent: Jun. 14, 2022

(54) AUGMENTED REALITY FOR SLICE MANAGEMENT IN A TELCO NETWORK

(71) Applicant: VMware, Inc., Palo Alto, CA (US)

(72) Inventors: Radhakrishna Embarmannar Vijayan, Bangalore (IN); Sameer Tatiraju, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/215,731

(22) Filed: Mar. 29, 2021

(65) Prior Publication Data

US 2021/0218640 A1 Jul. 15, 2021

Related U.S. Application Data

(63) Continuation of application No. 16/571,222, filed on Sep. 16, 2019, now Pat. No. 10,965,544.

(30) Foreign Application Priority Data

Jul. 30, 2019 (IN) .............................. 201941030733

(51) Int. Cl.
H04L 41/22 (2022.01)
G06F 9/455 (2018.01)
G06F 3/04845 (2022.01)
G06F 3/01 (2006.01)
G06F 3/0482 (2013.01)
G06F 3/04815 (2022.01)

(52) U.S. Cl.
CPC .............. H04L 41/22 (2013.01); G06F 3/017 (2013.01); G06F 3/0482 (2013.01); G06F 3/04845 (2013.01); G06F 9/45558 (2013.01); G06F 3/04815 (2013.01); G06F 2009/4557 (2013.01)

(58) Field of Classification Search
None
See application file for complete search history.

(56) References Cited

U.S. PATENT DOCUMENTS

| 2015/0120616 | A1* | 4/2015 | Sullivan | G06Q 30/0205 706/11 |
| 2017/0017512 | A1 | 1/2017 | Csatari | |
| 2018/0033076 | A1* | 2/2018 | Roundtree | G06K 3/00 |
| 2018/0124095 | A1 | 5/2018 | Hamdi | |
| 2019/0050427 | A1* | 2/2019 | Wiesel | G06V 40/10 |
| 2019/0141021 | A1* | 5/2019 | Isaacson | G06Q 50/01 |

(Continued)

Primary Examiner — Toan H Vu
(74) Attorney, Agent, or Firm — Clayton, McKay & Bailey, PC

(57) ABSTRACT

Examples described herein include systems and methods for managing slices in a Telco network by using a graphical user interface ("GUI") with augmented reality ("AR"). A user device can scan a code that is related to physical hardware in a datacenter. Based on the code, the GUI can display at least one virtual component that resides on that hardware. The user can move the virtual component from one slice to another, such as by dragging it to a displayed slice region. Similarly, the user can drag the virtual component to new physical hardware. This can cause an AR engine to contact an orchestrator to route traffic to the virtual component according to the new slice identifier and new hardware. The GUI can also provide a datacenter map to related physical or virtual components, allowing the user to locate and inspect other hardware relied on by a slice.

20 Claims, 7 Drawing Sheets

(56) References Cited

U.S. PATENT DOCUMENTS

| | | |
|---|---|---|
| 2019/0380171 A1 | 12/2019 | Kondapalli |
| 2020/0076685 A1 | 3/2020 | Vaidya |
| 2020/0250356 A1* | 8/2020 | Santarone ............... G01S 19/48 |
| 2020/0314015 A1 | 10/2020 | Mariappan |
| 2020/0359451 A1 | 11/2020 | Reno |
| 2021/0133160 A1* | 5/2021 | Craft .................. G06Q 30/0631 |

* cited by examiner

AUGMENTED REALITY FOR SLICE MANAGEMENT IN A TELCO NETWORK

RELATED APPLICATIONS

This application claims priority as a continuation of U.S. patent application Ser. No. 16/571,222, entitled "Augmented Reality for Slice Management in a Telco Network," filed Sep. 16, 2019, which claims benefit under 35 U.S.C. 119 (a)-(d) to Foreign Application Serial No. 201941030733, entitled "AUGMENTED REALITY FOR SLICE MANAGEMENT IN A TELCO NETWORK," filed in India on Jul. 30, 2019, by VMWARE, INC., both of which are herein incorporated by reference for all purposes in their entireties.

BACKGROUND

Network slicing is a form of virtualization that allows multiple logical networks to run on top of a shared physical nets network infrastructure. A distributed cloud network can share network resources with various slices to allow different users, called tenants, to multiplex over a single physical infrastructure. For example, Internet of Things ("IoT") devices, mobile broadband devices, and low-latency vehicular devices may all need to share a 5G network that is allocated into slices. Network slicing can allow the physical network to be partitioned at an end-to-end level to group traffic, isolate tenant traffic, and configure network resources at a macro level. Accordingly, slice-based networking may enable dramatic increases in network usage.

To maximize usage of the physical infrastructure, virtual components can be created and moved based on current demands at particular locations. A slice may implement a service chain of virtual components, such as virtual network functions ("VNFs"), for performing the certain network tasks the slice is responsible for. But the locations of these virtual components can be dynamic. Each client can have a service level agreement ("SLA") that defines minimum performance characteristics, and dynamic movement can help ensure those requirements are met. For example, an SLA can define minimum latency, bandwidth, and security requirements. An orchestrator process can continually change locations of virtual components to ensure SLA compliance for multiple tenants across multiple slices.

However, the dynamic nature of virtual component placement in a sliced network can make management of the infrastructure difficult, A data center operator likely will not know what virtual components are even running on particular servers or server racks. The difficulty in identifying which physical hardware contains which virtual components can result in inefficient problem solving and repairs when a problem occurs. Data center complexity can make it very difficult for an operator to even find the correct server where a problem is occurring within rows upon rows of server racks.

Current technologies also do not give an operator enough visibility and control to easily determine where problems exist and easily move virtual components to different servers or slices. The relationships between physical and virtual layers for a slice are not clearly visible to administrators. Additionally, moving a virtual component to a new slice or new hardware can require complex setup that is not practical within the framework of a dynamically moving 5G Telco environment.

As a result, a need exists for systems with improved user interfaces for slice management. Particularly, a need exists for augmented-reality-enabled data centers.

SUMMARY

Examples described herein include systems and methods for augmented reality management for slices in a Telco network. The system can include a graphical user interface ("GUI") that provides enhanced features for managing slices and their associated virtual components. The GUI can allow an administrative user, such as an information technology ("IT") professional, to troubleshoot issues in a virtual or physical layer of the network. In particular, the GUI can help visualize network-related issues, allow the user to quickly identify the associated physical hardware, and to move virtual components to other hardware or slices. Identifying such issues can help reduce downtime in a datacenter, which in turn helps ensure SLA requirements are maintained.

In one example, a user device, such as a tablet or virtual reality headset, can run an augmented reality ("AR") interface and AR engine as part of an AR application. The user device can scan a code for a physical hardware component at a datacenter. For example, a QR code can be placed on or near a server, and the user can use the AR interface to scan that code. The AR engine can then send a request to a backend service, which can retrieve a physical hardware component matching an identifier referenced by the code. The backend service can also retrieve at least one virtual component that runs on the physical component.

The AR interface can include a graphical user interface ("GUI") that displays at least a first virtual component that resides on the physical hardware component. The same GUI screen can also display a representation of the physical hardware component. For example, the GUI can display a representation of a server and a representation of a virtual machine ("VM") that resides on that server. The user can, in one example, expand a virtual overlay on the GUI. The virtual overlay can contain multiple levels of virtual components, including the VM, that execute on the physical hardware component, such as a server.

The GUI can also display first and second slices that utilize the physical hardware component. The slices can be represented as regions on the GUI, where corresponding virtual components can be located. As an example, VNFs for a first slice can be shown in a first slice region. VNFs for a second slice can be shown in a second slice region. Additional slices available to a tenant can also be shown, even when no virtual components currently reside on the physical hardware component that correspond to those additional slices. Representing the additional slices can allow the user to move virtual components to those slices.

In one example, the GUI can receive a selection to move the virtual component. The movement can be to a different hardware component, from the first slice to the second slice, or both. For example, the user can drag the virtual component, such as a VM or VNF to a new physical hardware component. Alternatively, the user can drag the virtual component from the first slice to the second slice. This can cause the AR engine to send a request to an orchestrator service responsible for making such movements. The orchestrator service can notify the AR engine whether the move was successful, and the GUI can update accordingly.

The GUI can be two-dimensional or three-dimensional. For example, when the user device is a tablet, the GUI can be two-dimensional. When the user device is an AR headset, the GUI can be presented in three dimensions. Selections in that scenario can include gestures at various distances out from the AR headset.

The method can be performed as part of a system to provide visual overlays for network insights, in an example. This can include executing, by a processor, instructions in a none-transitory, computer-readable medium to carry out the various stages.

Both the foregoing general description and the following detailed description are exemplary and explanatory only and are not restrictive of the examples, as claimed.

DESCRIPTION OF THE EXAMPLES

Figure 1:
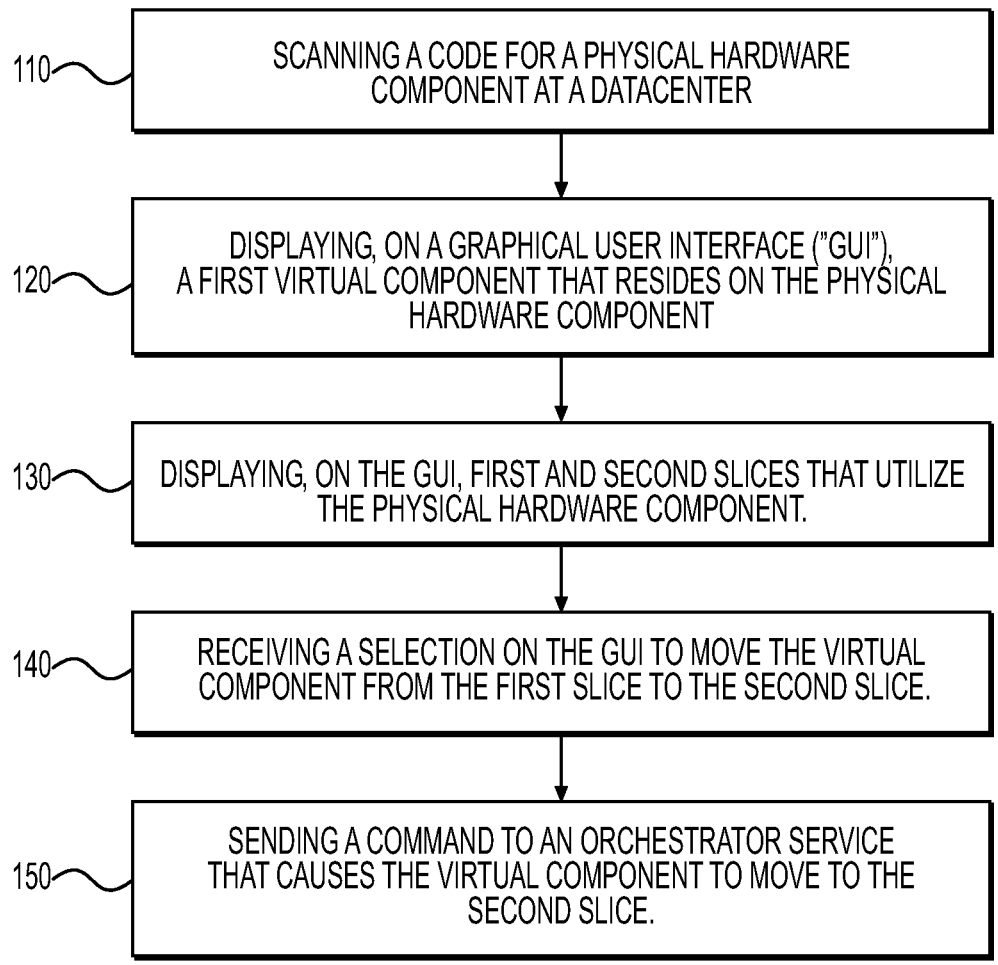
FIG. 1 is a flowchart for an example method for augmented reality for slice management.

Reference will now be made in detail to the present examples, including examples illustrated in the accompanying drawings. Wherever possible, the same reference numbers will be used throughout the drawings to refer to the same or like parts. Certain words that are used in this disclosure can have various equivalencies and are not intended to be limiting or exclusionary. Examples described herein include systems and methods for augmented reality for slice management.

A GUI can visualize a virtual and physical topology in a slice-based network, allowing an administrative user to determine interactions between virtual and physical components and move virtual components to new slices or hardware when needed. In one example, the user can utilize a user device to scan a code on a physical hardware component at a datacenter, such as a server or a server rack. For example, the user device can include a camera or other scanner that reads a QR code or some other code type. A corresponding identifier can be used at a database to identify the physical hardware. If no match exists, then an assurance service can send the code to one or more domain managers until matching physical hardware is identified.

The assurance service can retrieve virtual components that exist on the physical hardware, along with events and alerts. The assurance service can also return, for one or more virtual components, a measure of complexity of relationships between the virtual component and other virtual components. For example, a first hypervisor can be interacting with many VMs, and a high complexity number could indicate to the user that it could be advantageous to move VMs to another hypervisor with less complexity.

Based on this information, the GUI can display a first virtual component that resides on the physical hardware component. The virtual component can be expanded to show relationships with parent and child components, in an example. Additionally, icons representing alerts can be placed on the virtual component. Complexity can also be represented.

The first virtual component can also be displayed within an area designated for a particular slice. For example, first and second slices that at least partially utilize the physical hardware can be displayed. The virtual components on the physical hardware can be displayed within regions for the respective slices to which they belong.

The user can drag a virtual component from one slice to another, in an example. This can cause the GUI to send a command to an orchestrator service. The orchestrator service can be responsible for creating, moving, and deleting virtual components within the network. The orchestrator service can cause the virtual component to move to the second slice.

In addition, the user can receive information about other hardware that can be utilized in a slice path. The user can select a second such hardware component, and the GUI can display a datacenter map to guide the user to the second hardware component. This can allow the user to quickly navigate through the datacenter to check on or maintain related hardware that may be impacting slice performance.

FIG. 1 is a flowchart of an example method for augmented reality management for slices. At stage 110, the user can scan a code for a physical hardware component at a datacenter. The physical hardware component (also called "physical component" or "hardware component") can be a server or a server rack. In one example, the physical hardware component has a code, such as a R code, that the user can scan with a user device. The code can be placed on the physical hardware component in one example. The user device can be any processor-enabled device, such as a phone, tablet, laptop, smart scanner, or computer. The user device can have a camera or other scanning mechanism integrated into it. This can allow the user to scan the code, which then can be converted into an identifier that is associated with the physical hardware component.

The identifier can be used by the user device or a backend process to identify the physical hardware component and gather information about related components, events, and alerts. In one example, the GUI can be part of an AR interface on the user device. The AR interface can send the code to an AR engine, which can also execute on the user device or elsewhere. The AR interface and AR engine can be part of the same application, in an example. The AR engine can translate AR interface activities, such as a scan or gesture, into actionable requests, using an application programming interface ("API") to communicate with backend services. In one example, the AR engine uses the code to request information from a service assurance manager, which can be a backend service that tracks relationships between components in a network topology.

The service assurance manager can communicate with multiple services within the Telco cloud, such as domain managers for the physical network and virtual network and an orchestrator process. This can allow the service assurance manager to build a topology of relationships between virtual and physical components. In one example, this is done by maintaining a graph database in which nodes represent virtual and physical components. Edges between the nodes can represent relationships. In this way, a graph database can, for example, link VNFs and other virtual components to particular hardware.

Discovery of physical components can include identifying the physical servers, routers, and associated ports that are part of the Telco cloud. The discovery process can be periodic or continuous. In one example, a service performs the hardware discovery and creates a physical model to track which hardware is part of the Telco cloud. This can include identifying hardware along with certifications pertaining to that hardware. This information can be reported to the service assurance manager. The physical model can further include identification of bridges, local area networks, and other information describing or linking the physical components.

Discovery of virtual components can include identifying VNFs and other virtual components that operate as part of the Telco cloud. The virtual components can represent virtual controllers, virtual routers, virtual interfaces, virtual local area networks ("VLANs"), host VMs, or other VNFs. The physical components can report which VNFs they are running, in one example, By discovering both the physical and virtual components, the system can map these together.

Using the code from the AR engine, the service assurance manager can retrieve the physical component and related virtual components and hardware other physical components). For example, based on the graph database, the service assurance manager can retrieve virtual components that can execute on the physical component referenced by the code. Similarly, the graph database can allow the service assurance manager to retrieve additional hardware that is, for example, connected to the physical component. This information can be sent back to the AR engine.

At stage 120, the GUI can display virtual components related to the physical component identified by the code. This can include displaying both the physical component, such as the server, and a first virtual component that resides on the physical component. The physical component itself can be viewed as part of a physical underlay, which can provide more detail on the hardware associated with the physical component. For example, a hardware server can include multiple physical switches and cards, which can be shown as part of a physical underlay for that physical server. The physical server itself can have an entire rack of different physical components.

The user can also choose to display a virtual underlay, which can show the virtual components that are executing on that server. The virtual underlay can also provide links from virtual components to virtual components that reside on different physical components. For example, a slice path can have multiple VNFs, only some of which may reside on the physical component for which the code was scanned.

In one example, the virtual and physical underlays can display as expandable hierarchies. The AR engine can receive a hierarchy of components, such as in an extensible markup language ("XML") file, from the service assurance manager. One or more levels of the hierarchy can be displayed on the GUI. The hierarchy can expand or collapse based on user selections on the GUI. For example, an initial view can include the physical server and a collection of VMs that execute on the physical server. The user can select to show children of the VMs, which can include a hypervisor on which they execute. Similarly, a button or a particular gesture can show parents of the VMs, such as a logical router with which they communicate.

As these levels are revealed, the GUI can place any alerts or event notices next to the relevant virtual or physical components. In one example, the hierarchy can automatically expand to the level where one or more alerts exist. Because the physical component can have multiple pieces of hardware associated with it, an alert or failure for a piece of hardware can impact some but not necessarily all of the virtual components. The GUI can display which virtual components are impacted, in an example.

At stage 130, a selection on the GUI can cause the GUI to display first and second slices that utilize the physical component. This can mean that each of the first and second slices have a virtual component (e.g., a VNF) that runs on the hardware. The slices can display as separate regions on the GUI, each with their associated virtual components located within the respective region. Slices can highlight differently based on their status. For example, if a hardware failure is impacting the second slice, it can highlight red. The virtual component(s) of the second slice that are impacted by the hardware failure can display with alert icons. The alerts themselves can describe the problem. The alert can also display with a recommended action, such as moving the virtual component to a different slice or hardware.

At stage 140, the GUI can receive a selection to move the virtual component from a first slice to a second slice. In one example, the user can drag the virtual component, such as a VM, from one slice region into another. The GUI can warn the user if they are attempting to drag the virtual component into a slice that corresponds to a different tenant than the original slice. This can prevent the administrator from accidentally moving a component that may be needed by the first tenant into a slice that does not correspond to that tenant. In one example, other potential destination slices that correspond to the same tenant can be highlighted when the user begins to drag the virtual component. Alternatively, slices for other tenants can be grayed out or otherwise indicate they will not accept the dragged virtual component.

In another example, the user can move the virtual component to a different hardware component while keeping the virtual component in the same slice. For example, the user can drag the virtual component to a physical component in the physical overlay. In one example, hardware components that are above a threshold on an SLA requirement can be blocked from accepting the virtual component.

A complexity score can display for the virtual overlay in one example. The complexity score can indicate how many connections to the virtual components exist. If a single hypervisor is serving too many virtual components (as indicated by a high complexity score), the user can decide to move one or move virtual components to a different slice or to a different physical component with lower complexity.

At stage 150, the AR engine can send a command to an orchestrator service ("MANO" or "orchestrator") that causes the virtual component to move according to the gesture on the GUI. This can include sending a message to the service assurance manager (e.g., to relay to the orchestrator) in one example. If the user dragged the virtual component to a new slice, the orchestrator can perform various tasks to start up the virtual component for that slice. This can mean moving the virtual component to different hardware, depending on SLA requirements. For example, the latency or round-trip-time requirements for a slice can dictate where VNFs are placed. If they are placed across the country from one another, then these metrics will tend to perform worse than if VNFs are placed together on the same or nearby servers. Additionally, edge nodes for a slice, which can represent ingress or egress points, can dictate which other servers are appropriate for virtual components associated with that slice.

In this way, an orchestrator can cause a VNF instance to be instantiated at site in an appropriate location (region), and cause network traffic to be directed to the new VNF. In one example, a virtual infrastructure manager ("VIM") may carry out an assignment process for distributing portions of a workload to a region that includes a VNF that the VIM determines is optimally located to ensure a performance threshold is not violated. A workload can include multiple virtual components. In one example, a VIM can communicate the workload assignments (distributions) to an orchestration service for a slice-based network that controls where and how much network traffic is directed to specific components of the network.

If the orchestrator is able to move the virtual component as requested by the AR engine, then the orchestrator can send an indication of success back to the AR engine. This can cause the GUI to update by indicating a successful move. In one example, after the user drags a virtual component, it can remain highlighted yellow until the move completes successfully. However, if the orchestrator cannot complete the move, then it can update the AR engine accordingly. The GUI can then show the virtual component back at its original location. In one example, the instance of the virtual component will not be paused or deleted by the orchestrator based on the AR engine request unless the orchestrator determines that the virtual component can be launched at the new destination.

Figure 2:
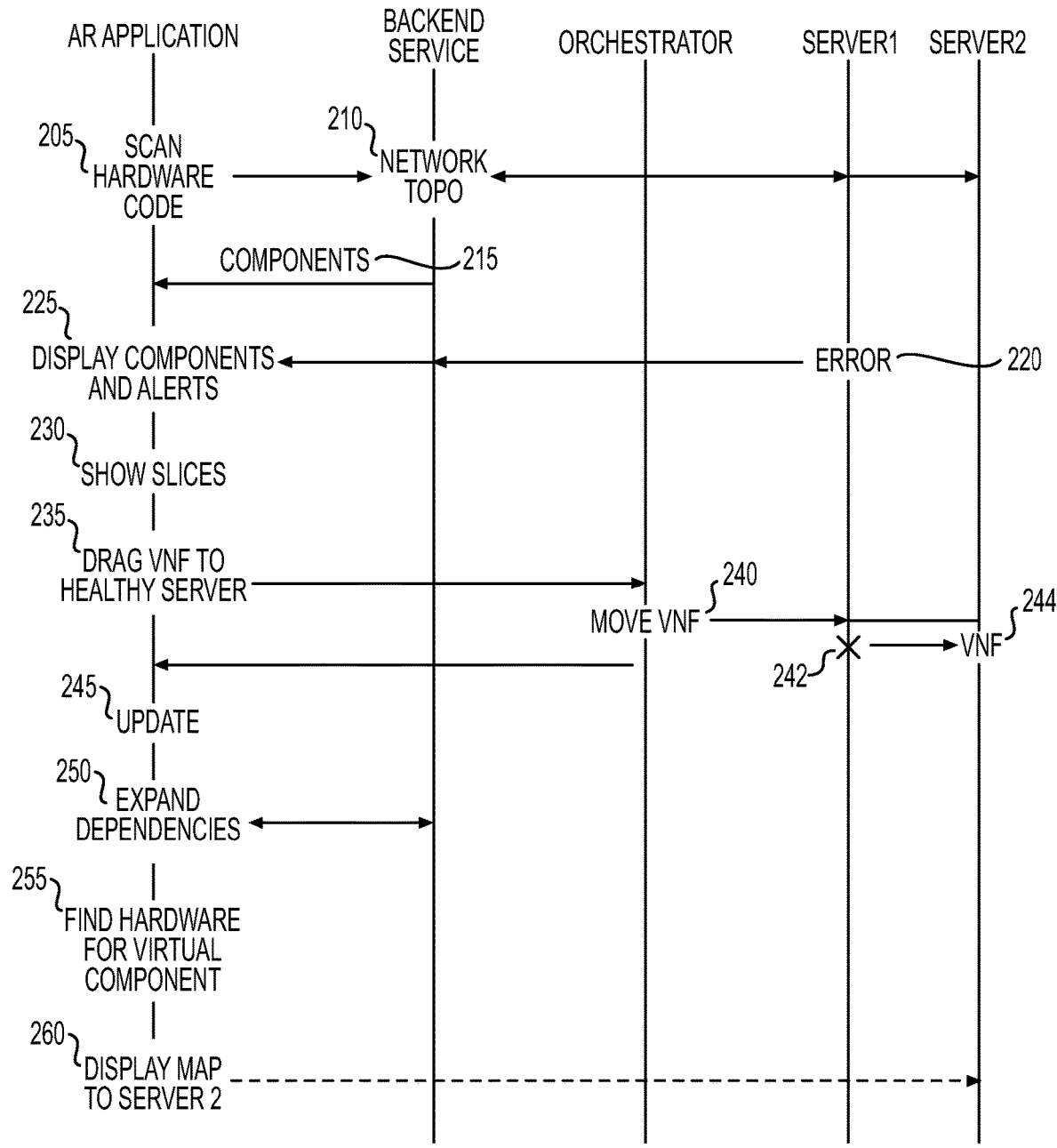
FIG. 2 is an example sequence diagram with stages for providing overlays for network insights.

FIG. 2 is a sequence diagram for AR management of slices. At stage 205, an AR application operating on a user device can scan a hardware code. The AR application can include a GUI and also scanner functionality in an example. The scan can include reading a QR code in one example. The code itself can be placed on any physical hardware. The AR application can include an AR engine that sends a request to a backend service to retrieve the physical component and related components based on the code.

At stage 210, the backend service can match the code with one or more physical components in a network topology. This can include identifying the physical component based on an ID that is the same as, or derived from, the code. The backend service can further identify related virtual components and hardware, such as virtual components that run on the physical component and hardware that makes up the physical component. The network topology can be built based on the backend service communicating with various VIMs, orchestrators, and domain managers. The network topology can be maintained as a graph database, with nodes representing virtual and physical components and edges representing relationships between the components. When a server receives a new virtual or physical component, a domain manager for that server can report the components to the backend service, in an example.

At stage 215, the components identified based on the code can be sent back to the AR application from the backend service. The components can include both virtual and physical components in an example. In one example, the backend service sends a hierarchy of components to the AR application. This can be done using an XML file in an example, but other file formats are also possible. The components can include at least one virtual component that executes on the physical hardware (e.g., a sever; associated with the code).

However, in another example, the code can correspond to a new piece of hardware that needs to be connected to a server rack. In that case, the network topology 210 can indicate which server rack. For example, the code can indicate a new hardware and not match anything currently in the graph database. In that case, backend service can identify a server or other physical component at stage 215 that could use the particular hardware type, based on either a lack of resources or some sort of error or alert. The GUI of the AR application can then display a map to that server rack at stage 260 so that the user can easily find where the new hardware should be implemented.

Additionally, the backend server can track errors and alerts at stage 220. This can include receiving errors from domain managers, VIMs, or other services that monitor physical or virtual network health. The alerts can be tracked along with the components. Therefore, when the backend service sends the components back to the AR application at stage 215, the backend service can include relevant errors, events, and alerts (together referred to as "alerts"). The alerts can be included in the same XML file as the hierarchy of components in one example.

When the code matches hardware in the network topology at stage 210, the components sent at stage 215 can be displayed on the GUI at stage 225. In one example, the physical hardware, such as a server, is displayed. Then the user can manipulate the GUI to display one or both of the virtual layer and the physical layer. For example, displaying the virtual layer can cause virtual components to display. These can be the virtual components that are on the physical hardware. In one example, they can be limited to a particular set of slices or tenants. The corresponding alerts can also be displayed next to the virtual components in the GUI.

At stage 230, the GUI can display slices that operate using the physical hardware. The slices can be displayed as regions and corresponding virtual components can be displayed within those regions. A single tenant can have multiple slices that correspond to different services or different quality of service ("QoS") levels for the same service. In one example, if a slice is not meeting SLA requirements or is within a threshold closeness to not meeting the SLA requirements, that slice can be highlighted on the GUI. This can prompt the user to move virtual components to the slice to increase compute power, in an example. Alternatively, it can prompt the user to move some of the virtual components to new physical hardware that provides better SLA compliance.

At stage 235, the GUI can allow the user to drag a virtual component, such as a VNF, to a new slice or to a new physical component. In one example, available slices are displayed together on the GUI screen. Slices can be sorted based on tenant, in an example. Slices can also be sorted based on service type. The user can drag the virtual component from its current slice region into another slice region. This can cause the AR application to request the movement from the orchestrator.

In another example, the user can drag the virtual component to a new physical component. To do so, the user can expand relevant portions of the virtual and physical underlays. This can allow, for example, the user to drag virtual components to a different server blade or card in the server rack. This can be helpful, for example, when the user knows that one or more pieces of hardware will be down for maintenance or replaced. In one example, the user can also search for underutilized servers or servers that the backend service predicts could increase performance based on the graph database and current performance of the various nodes. Then the user can drag the virtual component to one of those identified physical components.

In one example, an alert displayed at stage 225 can include suggestions for alleviating the alert. This can include a suggestion to move the virtual component. The user can simply accept the suggestion in one example, causing the AR application to request the suggested movement. This suggested movement can be to move the virtual component to a new slice or new physical component.

At stage 240, the backend service can receive the request from the AR application to move the virtual component. The orchestrator can determine whether the move is possible. This can be based on the predicted impact to SLA performance, whether the selected physical component is already overloaded, and whether the virtual component is barred from co-existing with any other virtual components already on the physical component. Likewise, there may be other virtual components that must exist with the virtual component being moved, so the orchestrator can deny movement on that basis. Alternatively, the orchestrator can send a return message that causes the GUI to prompt the user regarding whether they would like to move the co-dependent virtual components as well.

In the example of FIG. 2, the user has dragged a VNF from a first physical component to another physical component. This could happen, for example, when the first physical component is unhealthy or overburdened. At stage 240, the orchestrator can move the VNF by instantiating a new version of the VNF on the second server at stage 244 and deleting the VNF at the first server at stage 242. The orchestrator can issue commands to VIMs to accomplish the addition at stage 244 and deletion at stage 242, in an example. The orchestrator can also set various slice tables and routing tables in the network so that traffic for that VNF now flows to the second server instead of the first server. Similarly, if the user dragged the virtual component to another slice, the orchestrator can update slice tables and routing tables such that traffic identified with the second slice routes to the virtual component.

The orchestrator can then send a message back to the AR application, indicating whether the move was a success. At stage 245, the GUI can update accordingly, displaying the virtual component in association with the new slice or physical hardware.

The GUI can also allow the user to inspect problems in a slice that are arising in different hardware. For example, the user can expand the slice path in one example, causing the GUI to display dependent components at stage 250. The dependent components can be VNFs that are part of the service chain for that slice, but that are located on different hardware. At stage 255, the AR application can determine the location of that hardware. This hardware can be a different physical component altogether, such as a different server or server rack, or just a different piece of hardware within the physical layer for the physical component whose code was scanned. The AR application can determine the location of the second physical component at stage 255. The AR application can do so based on information received from the backend services as part of the dependencies at stage 250, in an example.

If the location of the second physical component is different than that of the physical component being examined, the GUI can display a map button next to the second physical component, Selecting this button can cause the GUI to display a map to the second physical component at stage 260, The map can be specific to the datacenter itself. Server rack locations can be represented with boxes, and the map can highlight the destination where the second physical component is located. In one example, the map can also display the current position of the user, along with a route to follow to the second physical component. In the example of FIG. 2, the second physical component can be the second server, where the VNF was placed. The user can then walk to the second server to make any needed hardware adjustments.

Figure 3:
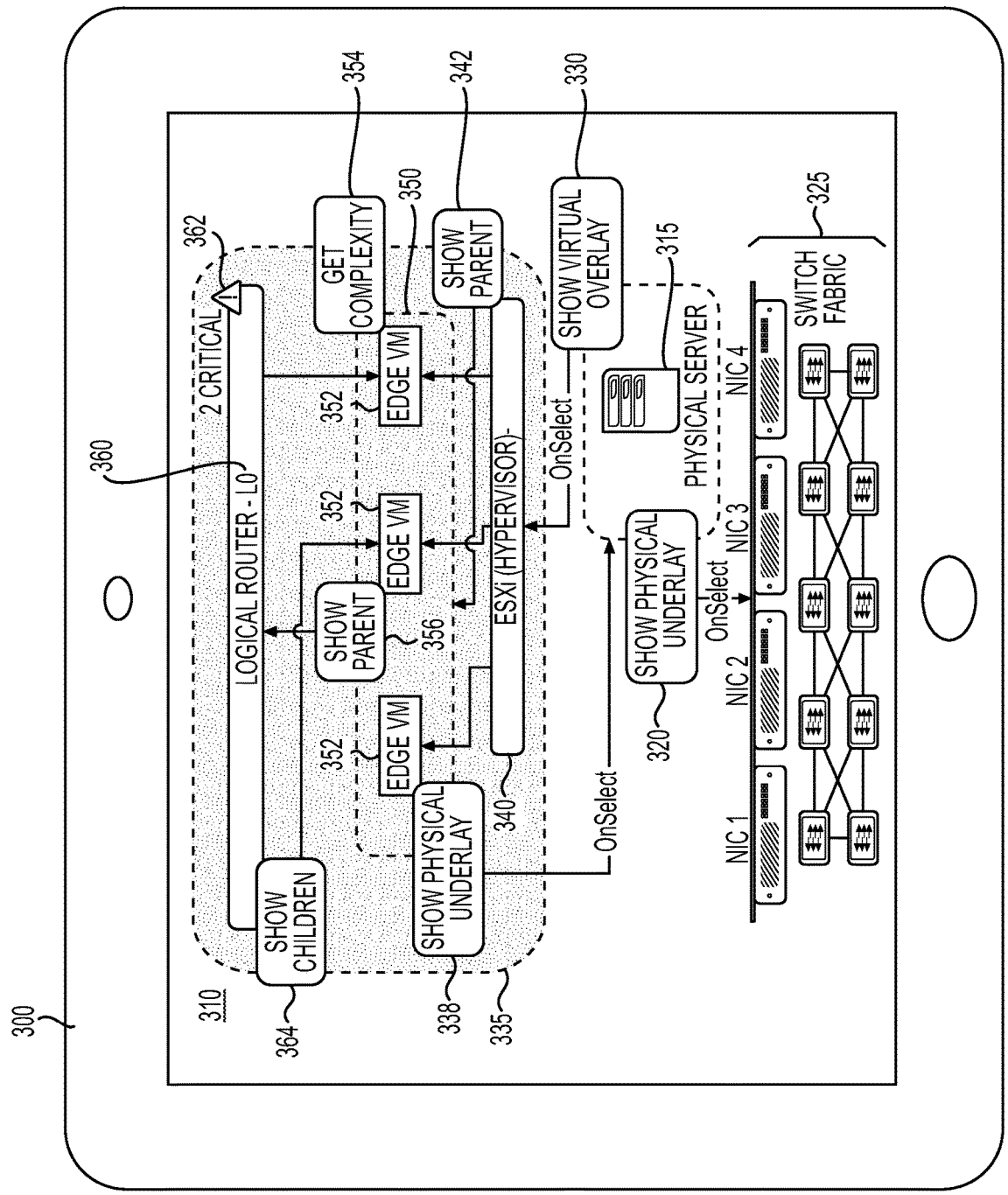
FIG. 3 is an example illustration of a graphical user interface ("GUI") for augmented reality for slice management.

FIG. 3 is an example illustration of a GUI screen 310 displayed on a user device 300. In this example, a physical server 315 is displayed. The physical server 315 can correspond to a code scanned by the user device 300, in an example.

The physical server 315 can have a corresponding physical underlay 325. To display the physical underlay, the user can select a button 320 or perform a particular gesture on the physical server 315. The physical underlay 325 can include a switch fabric or other hardware that is part of the server 315. In this example, the switch fabric includes four network interface cards ("NICs"). An NIC can be a card that is inserted into the server 315 to enable the server 315 to connect to a local area network ("LAN") for communication with other servers. The other servers can be in the same rack or at different locations in the datacenter.

The physical server 315 can also have a virtual overlay 335 that can be displayed by selecting a button 330. The virtual overlay 335 can include a hierarchy of virtual components that reside on the server 315, In this example, a set of VMs 352 can first be displayed. They can be arranged in a virtual component region 350. The region 350 can be slice-specific in an example. Alternatively, the region 350 can include all VMs 352 and VNFs. This region 350 can be expanded to show parents and children within the hierarchy of virtual components. For example, a child can be the hypervisor 340 that services the VMs 352, Tapping a button 356 to show parents can cause a logical router 360 to be displayed. Alerts 362 can be displayed with the logical router 360. Selecting the alerts 362 can cause the GUI screen 310 to display what the alerts are and potential remedial actions that the user can take.

In another example, the GUI screen 310 can first display a higher or lower level of virtual components, rather than the VMs 352, For example, if the GUI defaults to displaying hypervisor 340, then a button 342 to show parents can be placed on the hypervisor 340. Similarly, if the GUI shows the logical router 360, then a button to show children 364 can cause the VMs 352 to display. When components relating a button 342, 356, 364 are already displayed, selecting that button 342, 356, 364 again can hide the relevant parents or children.

The GUI screen 310 can also include a button 354 to get complexity. Complexity can be a function of one or more of the number of relationships to a component, the number of problems that component has, the number of problems related components have, and the number of problems that have explanations. In one example, the service assurance manager can query multiple domain managers that interact with the various components of the network to retrieve this information. The complexity of a network component, therefore, can depend on the number of dependencies to that network component and the number of errors across those dependencies. Complexity can be presented as a numeric value, in an example. Alternatively, it can be described with categories, such as very high, high, medium, and low.

Problem explanations for dependent components can also be counted as part of determining complexity. Explanations can be generated based on a root cause analysis ("RCA"), which can be performed at a backend service, such as the service assurance manager. The RCA can consider multiple symptoms from related physical and virtual components and determine a root cause based on past correlations of those symptoms. In one example, models can be built for determining RCA. A model can use key performance indicators ("KPIs") from virtual or physical components as inputs. These inputs can be compared against thresholds that define symptoms. If a particular set of symptoms is met, then a root cause problem can be identified. As an example, an RCA model can be defined as follows:

```
model ProblemExample {
attribute isPacketThresholdExceeded;
attribute packetDrop;
attribute packetRate;
attribute outputPacketRate;
SYMPTOM PacketThresholdBreach isPacketThresholdExceeded;
SYMPTOM ErrorPacket (packetDrop > 70);
SYMPTOM InputPacketRate (packetRate < 50);
SYMPTOM OutputPacketRate (packetRate < 50);
PROBLEM (PacketThresholdBreach && ErrorPacket &&
InputPacketRate && OutputPacketRate) }
```

The first symptom in this example is whether a packet maximum is exceeded. This can indicate that too much traffic is coming through a particular physical or virtual component, and the presence of this symptom can be represented by a Boolean expression. The next three symptoms include comparing the number of packet drops to a threshold of 70 or comparing packet rates to a threshold of 50. When error packets get too high or input and output packets are too low, this can indicate the physical or virtual component is not operating correctly. This example model defines a problem as existing when all of the symptoms are true.

Noting the complexity of a virtual or physical component can help the administrative user understand the importance of taking an action with respect to that component. Because high complexity can indicate that many portions of the network depend on the component, fixing issues with that component can be more important than with a low complexity component. Additionally, when deciding where to move a virtual component, a user can choose a slice or hardware component that does not have high complexity in order to avoid burdening particular components. For example, a server with a hypervisor having low complexity can be a good destination for a virtual component.

Figure 4:
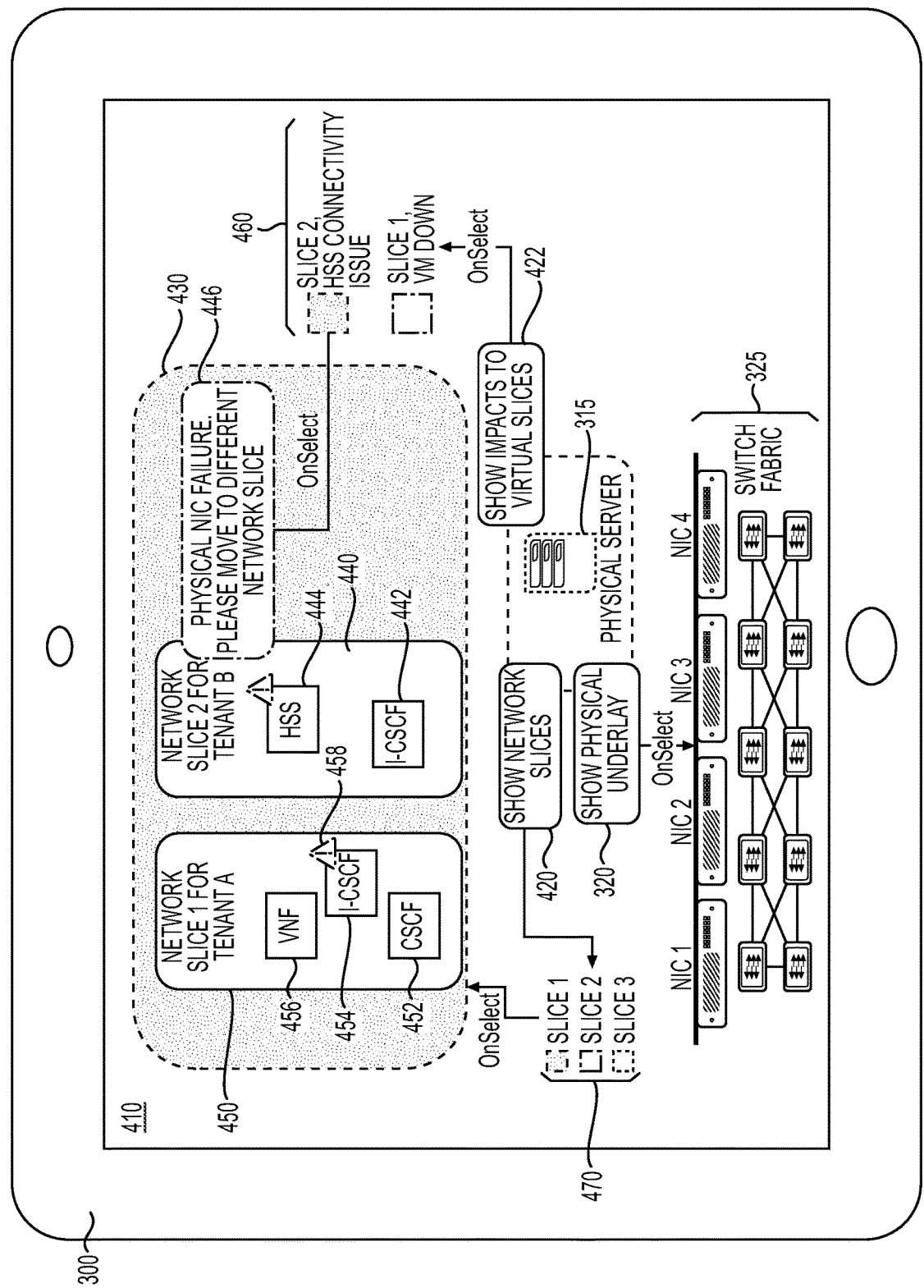
FIG. 4 is an example illustration of a GUI for augmented reality for slice management.

FIG. 4 is another example illustration of a GUI, this time with a second screen 410 that can represent different display options than in FIG. 3. In this example, the server 315 can include an option 420 to show network slices. When selected, the virtual components can be organized according to slice. In this example, three slices are listed 470 as represented. In one example, the list 470 can include all of the slices in the network. Alternatively, the list 470 can just be the slices that utilize some component, virtual or physical, on the server 315. The slices can be grouped together more closely or assigned the same color when they both are assigned to the same tenant. For example, if the second and third slices are assigned to a common tenant they can be colored the same or presented closer to one another than the first slice is to the second slice. In one example, the third slice can also correspond to the second tenant, Tenant B, but be used for providing a different level of QoS, in an example. A single tenant can utilize multiple slices for providing different services (e.g., streaming versus phone calls) or for different QoS Levels for the same service.

A virtual component region 430 can display slice regions 440, 450 that are specific to different slices. In this example, a first slice region 450 includes three virtual components 452, 454, 456 that all operate in the service chain of the first slice. A VNF 456 performs a network function specific to the first slice, A call session control function ("CSCF") 452 and an interrogating CSCF ("I-CSCF") 454 can be responsible for routing of certain messages within the first slice. In this example, the first slice is assigned to a first tenant, Tenant A.

A second slice region 440 includes two virtual components 442, 444 that operate in the service chain of the second slice. A home subscriber server ("HSS") 444 can act as a user authentication component and can assist in establishing calls or sessions in the second slice. The I-CSCF 442 can route some messages with the second slice. In this example, the second slice is assigned to a second tenant, Tenant B.

In one example, an option 422 placed near the server 315 allows the GUI to visualize impacts that the server 315 is having on the slices. Selecting this option can cause a slice overview 460 to display. The slice overview 460 can list all of the slices being impacted by the server 315. In this example, the second slice (slice 2) is noted as having an HSS connectivity issue. The first slice (slice 1) is described as having a VM down.

Corresponding alerts 446, 458 can be displayed on the virtual components 444, 454, having these conditions. The alerts 446, 458 can include an explanation or recommended remedial action if an RCA analysis has been successfully performed. In the example of FIG. 4, the alert 446 for HSS 444 of the second slice includes an explanation. The explanation can display upon selection of the alert 446, and state that a physical NIC failure exists. In one example, the specific NIC hardware could be displayed in the physical underlay 325 with a corresponding alert regarding the physical failure. The explanation of an alert 446 can also include a remedial action. In this example, the remedial action states that the HSS 444 should be moved to a different network slice. Other possible remedial actions can include moving the virtual component to another hardware component, restarting the virtual component, or deleting the virtual component. The I-CSCF 458 VM of the first slice also includes an alert 458. Since the user has not selected the alert 458, no explanation is currently displayed.

In one example, the user can use the GUI to move a virtual component, such as HSS 444. For example, the user can drag HSS 444 to another slice, as recommended by the alert 446. In this example, the user can either move the HSS 444 to the first slice or to the third slice. To move HSS 444 to the first slice, the user can drag HSS 444 from the second slice region 440 to the first slice region 4:50, This can also trigger logic that ensures moving the HSS 444 to a different tenant is allowed and can prompt the user to confirm this action. The AR application can then send a request to the orchestrator to make this change. If HSS 444 is moved to the first slice successfully, then the screen 410 can update to show HSS 444 within the first slice region 450.

Alternatively, to move the HSS 444 to the third slice, the user can drag HSS 444 from the second slice region 442 to a third slice region (not pictured) or to the third slice in the slice list 470. If the move is successful, this can cause a third slice region to populate on screen 410 within the virtual component region 430. The third slice region can then contain HSS 444, which can then be cleared of errors based on utilizing a different physical NIC associated with the third slice.

Figure 5:
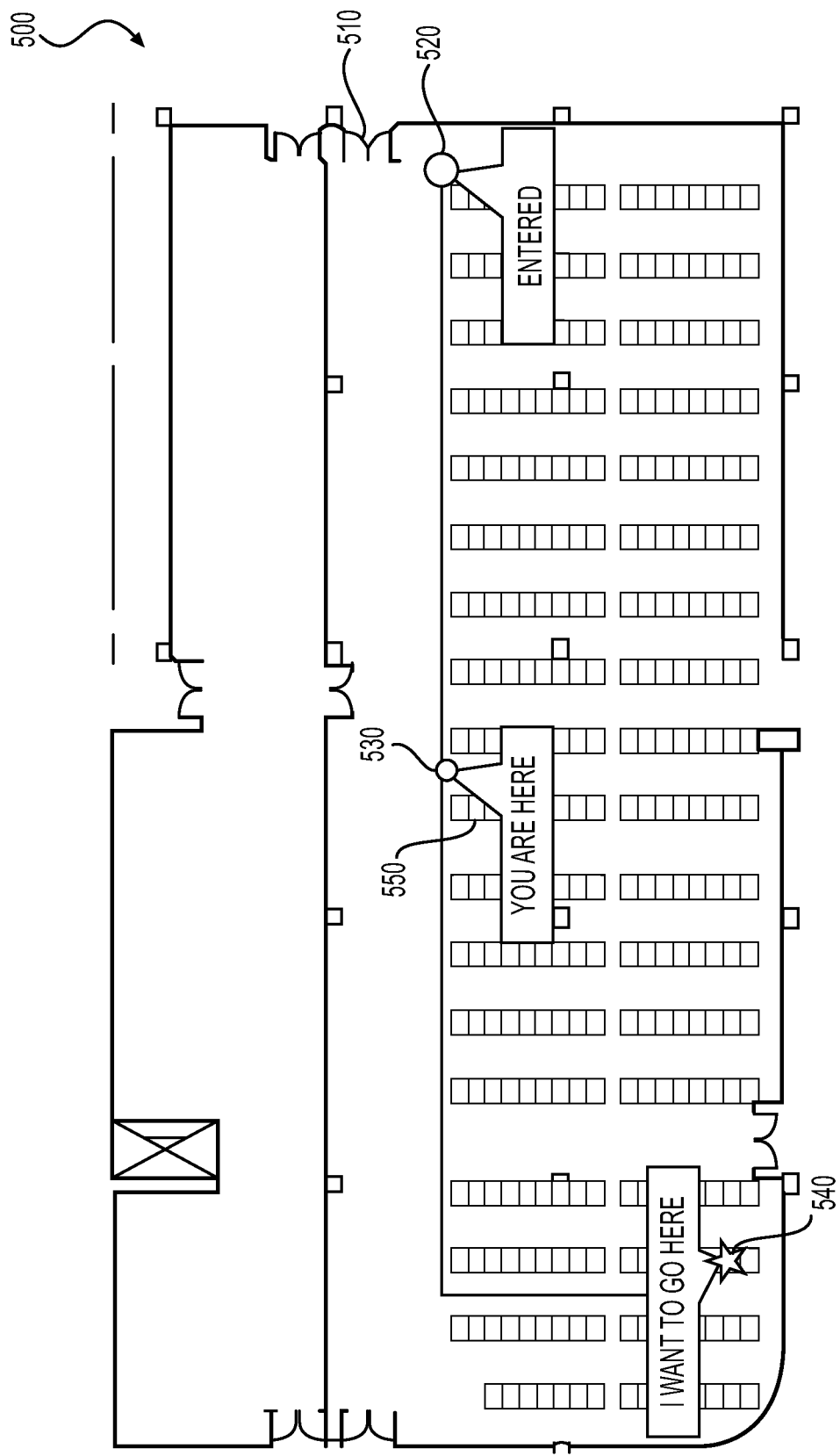
FIG. 5 is an example illustration of a GUI for augmented reality for slice management.

FIG. 5 is another example GUI screen 500 used to provide a user with a map to the physical location of a hardware component. Screen 500 can include a floorplan of the datacenter, in an example. In one example, the floorplan can help a user physically enter into the datacenter and locate a physical component. The floorplan can be displayed and overlaid with pertinent positional information, in an example.

For example, the screen 500 can illustrate an entrance point 520, and features such as doors 510. The screen 500 can also show where the user currently is located 530, and the destination 540 of the physical component.

The overlay can contain objects that represent different aspects of the physical layout of the datacenter. For example, server racks 550 can be represented as rectangles. Other system components can also be represented. Additionally, obstructions that would impact the user's route through the datacenter can be included in the map. In some examples, the most efficient route between the user's location 530 and the destination 540 is displayed on the screen 500.

Figure 6:
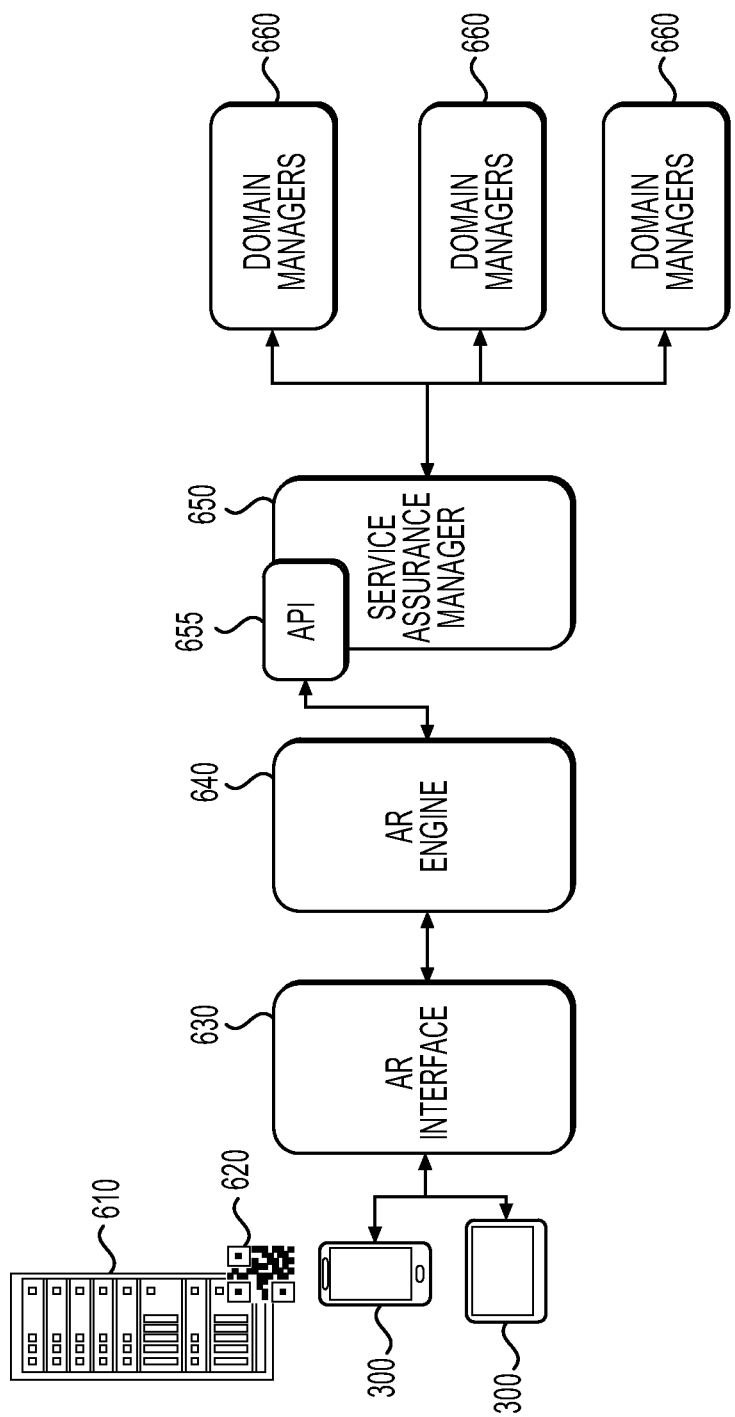
FIG. 6 is an illustration of example system components for augmented reality for slice management.

FIG. 6 is an example diagram of system components for AR management of slices. An AR interface 630 can run on one or more mobile devices 300. The AR interface 630 can include a GUI that receives user inputs, such as gestures and selections. The AR interface 630 can also include a scanning component, such as a camera. In one example, a different user device 300 can be used to scan than to receive gestures. For example, a scanner can be used for scanning and the user's tablet can display graphics on a GUI for the user to interact with. Alternatively, a single user device 300 can be used for both the scanning and the gestures.

The AR interface 630 can communicate with an AR engine 640. The AR engine 640 can run on the user device 300 in an example. Alternatively, the AR engine 640 can be located remotely from the user device 300, such as on an AR server. In that example, the AR engine 640 can receive inputs from the AR interface over a network, such as the internet.

The AR engine 640 can convert gestures, selections, inputs, commands, and scanned code identifiers from the AR interface 630 into actionable commands at a backend service, such as the service assurance manager 650. The AR engine 640 can do so by translating the AR interface 630 inputs into API requests 655. The backend service, such as the service assurance manager 650, can include an API for requesting particular types of information.

In one example, the user device 300 can scan a code 620 of a server 610. The server 610 can include a rack of hardware components. The code 620 can be a QR code or other type of code and can be located on or nearby the server 610. For example, a user may be tasked with fixing something in a datacenter. The user can scan a code 620 on a server 610 or server rack to see what components are on that server 610. Alternatively, a physical alert on the server 610 can indicate maintenance is needed, and the user can scan that server 610 to determine what virtual and physical components to move prior to the maintenance. The AR interface 630 can process the scanned code 620 and communicate an identifier to the AR engine 640. The AR engine 640 can then request component information from the service assurance manager 640 using the identifier. This can include issuing an API request 655 that includes the identifier.

The service assurance manager 650 can then match the identifier against a graph database of network components to determine which physical component the user scanned. The graph database can include nodes that represent virtual and physical components, with edges indicating relationships. The nodes can have identifiers that the service assurance manager 650 compares against the identifier received from the AR engine 640, in an example. Alternatively, or if no match exists, the service assurance manager 650 can check with multiple domain managers 660 to identify the physical component. Domain managers 660 can track the locations and identities of various components in the network and can provide routing information to reach those components. The domain managers 660 can be directed to different domains, such as a server manager, internet protocol ("IP") domain manager, or multiprotocol label switching ("MPLS") domain manager. In one example, the service assurance manager ("SAM") has its own domain manager.

The service assurance manager 650 can then return a physical component to the AR engine 640 for display on the GUI of the AR interface 630. In addition, at least one virtual component that resides on the physical component can be returned for display along with the physical component on the same GUI screen. As has been described, the service assurance manager 650 can return a hierarchy of components and alerts, allowing the user to expand and explore the relationships between network components within a slice.

Figure 7:
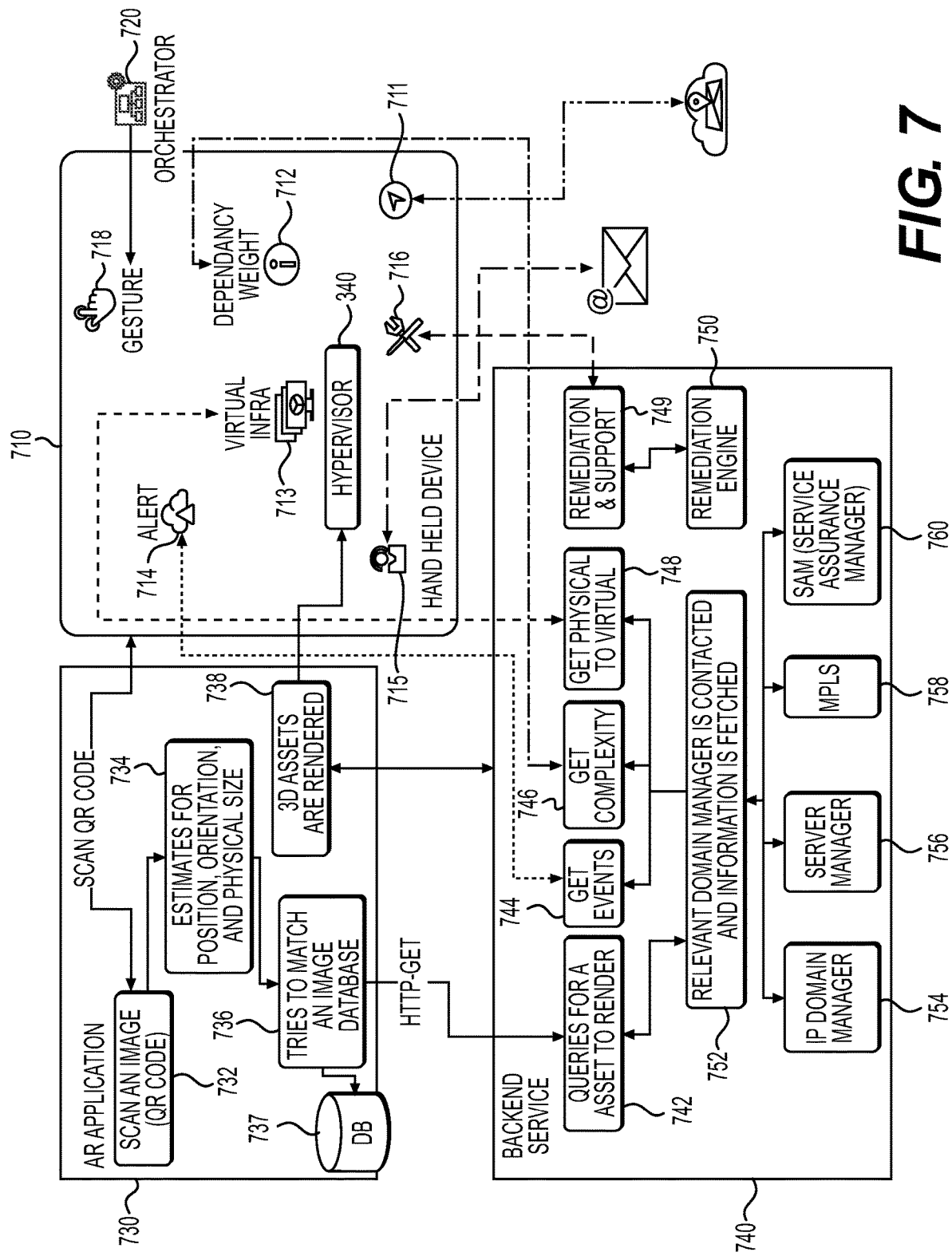
FIG. 7 is an illustration of example system components for augmented reality for slice management.

FIG. 7 is example diagram of system components and associated stages. An AR application 730 can include the AR interface 630 and AR engine 640, in an example. At stage 732, the AR application 730 can scan a code. The code can be any image or symbol, including a QR code. The image can be converted into a usable identifier at stage 734. This can be based on an algorithm that can be applied to the image once it is given the correct orientation and size. Then, at stage 736, the AR application 730 can attempt to match the adjusted image or attributes of the image against information in a database 737. The database 737 can return an identifier that, the AR application 730 uses to request the physical component and related virtual and physical components from the backend service 740. In one example, the AR application submits an API request to the backend service 740, using the identifier. This can be in the form of an HTTP GET command, in an example.

At stage 742, the backend service 740 can receive the request and use the identifier to query for a virtual or physical component (e.g., an asset) to render at the GUI 710. To do this, at stage 752, the backend service 740 can identify a relevant domain manager for retrieving information related to the component. This can include identifying the component based on the identifier at a graph database, then contacting the relevant domain manager. Alternatively, the domain managers are contacted using the identifier, and domain managers that recognize the identifier can respond back with information about one or more network components. In this example, potential domain managers can include an IP domain manager 754, server manager 756, MPLS domain manager 758, and a SAM domain manager 760. In one example, the SAM domain manager 760 has access to the graph database and can return information stored there based on the identifier. Then that information can be used to retrieve additional related information from other domain managers. Through this process, one or more virtual components can be identified that reside on the server to which the identifier pertains.

The AR application 730 can then render those components on the GUI 710 at stage 738. For example, a hypervisor 340 can be rendered that can then be expanded into a virtual overlay and physical underlay. This can reveal the relationships between the virtual and physical components for the scanned server, as well as relationships that extend out from the server to other devices and virtual components. A physical-to-virtual mapping can be retrieved at stage 748, such as from the graph database.

The rendering at stage 738 can be either two- or three-dimensional. For example, the GUI 710 can be displayed two dimensionally on a screen, such as a tablet screen. However, the user device 300 can be a virtual reality ("VR") device, in an example, such as a VR headset. In that instance, the rendering at stage 738 can be three-dimensional, such that the user can expand through the component hierarchy by making gestures 718 at distances relative to the user's face. The VR headset can interpret those gestures 718 and perform any of the stages 711-716, which will be discussed.

Additional information about the identified network components can be retrieved from the relevant domain managers 754, 756, 758, 760. For example, at stage 744 the backend service can retrieve events associated with those virtual components. This can include alerts and issues being reported to the backend service 740 by one or more of the components or domain managers 754, 756, 758, 760. Similarly, complexity can be calculated at stage 746 based on the number of relationships a network component has, and numbers and severity of errors or alerts across those related components. Additionally, remediation recommendations can be retrieved at stage 749, such as through use of a remediation engine 750. The remediation engine can apply several RCA models to determine root cause problems, which can then be used to retrieve proposed solutions.

The additional information of stages 744, 746, 748, and 749 can be retrieved based on user selections on the GUI 710, in an example. As noted above, this can also include gestures 718 in three-dimensional space when the GUI 710 is presented three-dimensionally in a VR headset or other VR user device. For example, the user can select an option to display a virtual overlay at stage 713, causing the backend service 740 to retrieve physical-to-virtual mappings at stage 748. Similarly, the user can select an alert associated with one of the virtual components in the virtual overlay at stage 714. This can cause the backend service 740 to get event details at stage 744 so that the user can view the content of the alert and, in an example, related components impacted by the same alert or root cause. The user can also select an option to display dependency weight at stage 712, which can represent how many dependent components rely on a particular virtual component. This can cause the backend service 740 to determine complexity at stage 746. Additionally, when a user expands an alert, the AR application 730 can also request remediation recommendations at stage 716. This can cause the backend service 740 to check with the remediation engine 750 at stage 749. The remediation engine can apply models based on known KPIs of the network component selected on the GUI 710. If a root cause problem is determined, the remediation engine can look up a remediation action that corresponds to the root cause problem and ancillary information, such as the existence of additional slices or other hardware that can also run the virtual component.

The GUI 710 can also allow the user to locate components within a datacenter at stage 711. For example, the user can expand out a virtual overlay and physical underlay, in an example. The user can select a component and an option to get the location of that component. The GUI 710 can then display a map of the datacenter, such as described for FIG. 5. The backend service 740 or AR application 730 can provide location information that is translated into a map location on the GUI 710. The GUI 710 can also show the user's relative location on the map.

In one example, the user can set notifications on the GUI 710 that cause the AR application 730 to send email or text alerts at stage 715 when certain criteria are present. For example, if a threshold number of errors are met, a manager can be automatically notified by email.

The GUI 710 also can accept gestures 718 and other selections to move virtual components to different slices or hardware. For example, a user can drag a virtual component from one slice region to another. This can cause the AR application 730 to contact an orchestrator 720 to redirect network traffic to the virtual component based on the new slice identifier. This can include changing information used at selectors, which can classify traffic into slices at, or prior to, an edge node of the network. The user can also move virtual components to different hardware, such as to a non-overloaded server or card within a server rack by dragging the virtual component to the new hardware. The orchestrator 720 can cause the new hardware to instantiate the virtual component, such as by communicating with a VIM that is responsible for that hardware.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather, any feature of any example described here can be incorporated into any other suitable example. It is intended that the specification and examples be considered as exemplary only, with a true scope and spirit of the disclosure being indicated by the following claims.

What is claimed is:

1. A method for augmented reality slice management, comprising:
   scanning a code of a physical hardware component in a datacenter;
   after identifying the physical hardware component based on the code, displaying, on a graphical user interface ("GUI"), a first virtual component that resides on the physical hardware component;
   displaying a first network slice associated with the first virtual component; and
   indicating, on the GUI, an alert that exists for the first virtual component.

2. The method of claim 1, further comprising displaying, on the GUI, multiple slices that utilize the physical hardware component.

3. The method of claim 1, further comprising:
   receiving a selection on the GUI to move the virtual component to a different hardware component; and
   sending a command to an orchestrator service that causes the virtual component to move according to the selection.

4. The method of claim 1, further comprising detecting a gesture to move the first virtual component to a second slice, wherein the GUI updates to show the first virtual component in association with the second slice in response to receiving an indication that the move was successful.

5. The method of claim 1, further comprising:
   based on the scanning, displaying multiple virtual components that reside on the physical hardware component, wherein each of the multiple virtual components is positioned based on the slice to which the virtual component belongs.

6. The method of claim 1, further comprising:
   displaying a second physical component associated with a second virtual component of the first slice; and
   based on selection of the second physical hardware component on the GUI, displaying a datacenter map that shows the location of the second physical hardware component.

7. The method of claim 1, further comprising:
displaying, on the GUI, a virtual overlay that includes virtual components executing on the physical hardware component;
based on a selection to show a parent of a hypervisor in the virtual overlay, displaying the first virtual component; and
based on a selection to show a parent of the first virtual component, displaying a router that is used by the virtual component.

8. A non-transitory, computer-readable medium comprising instructions that, when executed by a processor, cause the processor to perform stages for augmented reality slice management, the stages comprising:
scanning a code at a datacenter that includes a physical hardware component;
after identifying the physical hardware component based on the code, displaying, on a graphical user interface ("GUI"), a first virtual component that resides on the physical hardware component;
displaying a first network slice associated with the first virtual component; and
indicating, on the GUI, an alert that exists for the first virtual component.

9. The non-transitory, computer-readable medium of claim 8, the stages further comprising displaying an error and recommended remediation next to the first virtual component.

10. The non-transitory, computer-readable medium of claim 8, wherein the scanning causes the physical hardware component to be displayed on the GUI, and wherein the code is on a server rack and the GUI displays a physical underlay with multiple hardware components that exists in the server rack.

11. The non-transitory, computer-readable medium of claim 8, the stages further comprising:
based on the scanning, displaying multiple virtual components that reside on the physical hardware component, wherein each of the multiple virtual components is positioned based on the slice to which the virtual component belongs.

12. The non-transitory, computer-readable medium of claim 8, the stages further comprising displaying, on the GUI, multiple slices that utilize the physical hardware component.

13. The non-transitory, computer-readable medium of claim 8, the stages further comprising:
receiving a selection on the GUI to move the virtual component to a different hardware component; and
sending a command to an orchestrator service that causes the virtual component to move according to the selection.

14. The non-transitory, computer-readable medium of claim 8, the stages further comprising:
displaying a second physical component associated with a second virtual component of the first slice; and
based on selection of the second physical hardware component on the GUI, displaying a datacenter map that shows the location of the second physical hardware component.

15. A system for providing augmented reality slice management, comprising:
a non-transitory, computer-readable medium containing instructions; and
a processor that executes the instructions to perform stages comprising:
scanning a code of a rack that includes a physical hardware component;
based on the code, displaying, on a graphical user interface ("GUI"), a first virtual component that resides on the physical hardware component;
displaying a first network slice associated with the first virtual component; and
indicating, on the GUI, an alert that exists for the first virtual component.

16. The system of claim 15, the stages further comprising displaying multiple virtual components that reside on the physical hardware component, wherein each of the multiple virtual components is positioned based on a slice to which the virtual component belongs.

17. The system of claim 15, the stages further comprising:
displaying a second physical hardware component associated with the rack; and
based on selecting the second physical hardware component, displaying, on the GUI, virtual components running on the second physical hardware component.

18. The system of claim 15, the stages further comprising:
displaying a second physical hardware component associated with the rack, wherein selecting the second physical hardware component[AS1]; and
based on selection of the second physical hardware component on the GUI, displaying a datacenter map that shows the location of the second physical hardware component.

19. The system of claim 15, the stages further comprising displaying, on the GUI, multiple slices that utilize the physical hardware component.

20. The system of claim 15, the stages further comprising:
receiving a selection on the GUI to move the virtual component to a different hardware component; and
sending a command to an orchestrator service that causes the virtual component to move according to the selection.

* * * * *